United States Patent
Segawa

(10) Patent No.: US 8,271,792 B2
(45) Date of Patent: Sep. 18, 2012

(54) IMAGE PROCESSING APPARATUS, AUTHENTICATION PACKAGE INSTALLATION METHOD, AND COMPUTER-READABLE RECORDING MEDIUM

(75) Inventor: Hidekazu Segawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 765 days.

(21) Appl. No.: 12/361,254

(22) Filed: Jan. 28, 2009

(65) Prior Publication Data

US 2009/0210717 A1    Aug. 20, 2009

(30) Foreign Application Priority Data

Feb. 20, 2008    (JP) .................. 2008-038829

(51) Int. Cl.
*H04L 9/32* (2006.01)
(52) U.S. Cl. ...................................................... 713/176
(58) Field of Classification Search .................... 713/176
See application file for complete search history.

(56) References Cited

U.S. PATENT DOCUMENTS

| | | | |
|---|---|---|---|
| 6,996,622 B2 | 2/2006 | Itoh | |
| 7,203,310 B2 | 4/2007 | England et al. | |
| 7,222,151 B1 | 5/2007 | Schaeck | |
| 7,302,570 B2 | 11/2007 | Beard et al. | |
| 7,496,757 B2* | 2/2009 | Abbott et al. | 713/176 |
| 7,788,227 B1* | 8/2010 | Nettleton et al. | 707/640 |
| 7,844,819 B2* | 11/2010 | Minemura | 713/176 |
| 8,014,522 B2* | 9/2011 | Yen et al. | 380/44 |
| 8,122,254 B2* | 2/2012 | Uzawa | 713/176 |
| 2004/0111520 A1 | 6/2004 | Krantz et al. | |
| 2005/0108546 A1 | 5/2005 | Lehew et al. | |
| 2005/0229171 A1* | 10/2005 | Henry et al. | 717/168 |
| 2006/0066905 A1 | 3/2006 | Takashima et al. | |
| 2006/0195411 A1 | 8/2006 | Knight et al. | |
| 2006/0230276 A1* | 10/2006 | Nochta | 713/176 |
| 2006/0236113 A1* | 10/2006 | Uzawa | 713/176 |
| 2007/0277038 A1* | 11/2007 | Hardy et al. | 713/176 |

FOREIGN PATENT DOCUMENTS

| | | |
|---|---|---|
| EP | 1 130 494 A2 | 9/2001 |
| JP | 2001-209621 | 8/2001 |
| JP | 2001-243105 | 9/2001 |
| JP | 2003-515199 | 4/2003 |
| JP | 2003-517670 | 5/2003 |
| JP | 2003-521138 | 7/2003 |
| JP | 2003-284024 | 10/2003 |
| JP | 2003-529975 | 10/2003 |
| JP | 2004-213632 | 7/2004 |
| JP | 2005-149505 | 6/2005 |
| JP | 2006-504189 | 2/2006 |
| JP | 2006-65677 | 3/2006 |
| JP | 2006-91943 | 4/2006 |

(Continued)

*Primary Examiner* — Kambiz Zand
*Assistant Examiner* — Amare F Tabor
(74) *Attorney, Agent, or Firm* — Oblon, Spivak, McClelland, Maier & Neustadt, L.L.P.

(57) ABSTRACT

An image processing apparatus is disclosed that includes an installation unit that installs an authentication package providing a function related to authentication; a signature confirmation unit that confirms whether an issuance source of the authentication package is an authenticated issuance source based on an electronic signature attached to the authentication package; and an authentication package confirmation unit that confirms the authentication package based on attribute information of the authentication package confirmed to be the authenticated issuance source by the signature confirmation unit. In the image processing apparatus, the installation unit installs the authentication package confirmed by the authentication package confirmation unit.

9 Claims, 12 Drawing Sheets

FOREIGN PATENT DOCUMENTS

| | | |
|---|---|---|
| JP | 3807961 | 5/2006 |
| JP | 2006-244466 | 9/2006 |
| JP | 2006-246081 | 9/2006 |
| JP | 2007-505409 | 3/2007 |
| JP | 4016019 | 9/2007 |
| JP | 2007-529038 | 10/2007 |
| WO | WO 01/05098 A1 | 1/2001 |
| WO | WO 01/24059 A2 | 4/2001 |
| WO | WO 01/44886 A2 | 6/2001 |
| WO | WO 01/50416 A2 | 7/2001 |
| WO | WO 2004/038563 A2 | 5/2004 |
| WO | WO 2005/026915 A2 | 3/2005 |
| WO | WO 2005/041530 A1 | 5/2005 |

* cited by examiner

FIG.4

| SIGNER | SIGNATURE KEY | VENDOR ID |
|---|---|---|
| RICOH | 00:00:FF:DD:...:3F | 1 |
| GoodSmilers | 48:03:CF:FD:...:2A | 2 |
| : | : | : |

IMAGE PROCESSING APPARATUS, AUTHENTICATION PACKAGE INSTALLATION METHOD, AND COMPUTER-READABLE RECORDING MEDIUM

BACKGROUND OF THE INVENTION

1. Field of the Invention

The present invention relates to an image processing apparatus, an authentication package installation method, an authentication package installation program, and a computer-readable recording medium.

2. Description of the Related Art

Generally, when users use an apparatus, they are first required to perform user authentication such as login from the viewpoint of security. As a result of the authentication, only an authorized user+can use the apparatus within the range of an authorized right. For example, when users use a multi-function machine as an example of an image processing apparatus, they perform the authentication in accordance with authentication methods set by an administrator.

Among the authentication methods are an equipment local authentication method in which authentication information is managed and authenticated in a multi-function machine, a Windows (Registered Trademark) authentication method in which the authentication is performed in a Windows server, and a LDAP (Lightweight Directory Access Protocol) method in which the authentication is performed using user information, etc., in a LDAP server. Besides, authentication methods using an IC card, fingerprint authentication methods using a fingerprint, etc., are available. It is expected that other new authentication methods will emerge.

Here, a so-called "authentication package" is installed in the multi-function machine so as to additionally include a new authentication method that is not installed by default. In this case, particular attention should be paid so as to prevent an unauthorized package from being installed because the unauthorized package may cause a malfunction, etc., in other programs. In order to exclude such unauthorized software, there is provided a technique in which the authentication is performed before software is installed and only authorized software is installed.

Patent Document 1 describes an information processing system and an installation control method that has an authentication unit performing the authentication based on authentication information and is capable of properly performing various processes required for updating software components.

Patent Document 1: JP-A-2006-091943

However, conventional software installation methods are not dedicated to installation and plug-in of an authentication package.

SUMMARY OF THE INVENTION

The present invention has been made in view of the above problem and may provide an image processing apparatus having management procedures including the verification of an authentication package and authentication from a specific administrator. Also, the present invention may provide an authentication package installation method, an authentication package installation program, and a computer-readable recording medium.

According to an aspect of the present invention, there is provided an image processing apparatus comprising an installation unit that installs an authentication package providing a function related to authentication; a signature confirmation unit that confirms whether the issuance source of the authentication package is an authenticated issuance source based on an electronic signature attached to the authentication package; and an authentication package confirmation unit that confirms the authentication package based on attribute information of the authentication package confirmed to be the authenticated issuance source by the signature confirmation unit. In the image processing apparatus, the installation unit installs the authentication package confirmed by the authentication package confirmation unit.

Preferably, the attribute information of the authentication package may include an authentication package ID, an authentication package version, and a vendor ID related to generation of the authentication package.

Preferably, the authentication package confirmation unit may confirm whether the issuance source confirmed by the signature confirmation unit agrees with an issuance source corresponding to the vendor ID.

Preferably, the authentication package confirmation unit may confirm whether the format of the authentication package ID corresponds to a predetermined format.

According to another aspect of the present invention, there is provided an authentication package installation method of an image processing apparatus having an installation unit that installs an authentication package providing a function related to authentication. The authentication package installation method comprises a signature confirmation step of confirming whether the issuance source of the authentication package is an authenticated issuance source based on an electronic signature attached to the authentication package; and an authentication package confirmation step of confirming the authentication package based on attribute information of the authentication package confirmed to be the authenticated issuance source in the signature confirmation step. In the authentication package installation method, the installation unit installs the authentication package confirmed in the authentication package confirmation step.

Note that as an embodiment of the present invention, it is effective to apply the constituents and the combination of expressions and the constituents of the embodiment of the present invention to a method, an apparatus, a system, a computer program, a recording medium, etc.

Other objects, features and advantages of the present invention will become more apparent from the following detailed description when read in conjunction with the accompanying drawings.

BRIEF DESCRIPTION OF THE DRAWINGS

FIG. 4 is a diagram showing a list related to signature;

FIG. 5 is a sequence diagram when the authentication package is plugged in;

DETAILED DESCRIPTION OF THE PREFERRED EMBODIMENTS

Referring next to the accompanying drawings, a description is made of the best mode for carrying out an embodiment of the present invention. In the following description, an image processing apparatus is used as an example of an apparatus. However, any image processing apparatus or information processing apparatus may be used so long as it is of a type in which an authentication package is installed (plugged) according to the embodiment of the present invention.

(Software Configuration Diagram)

Figure 1:
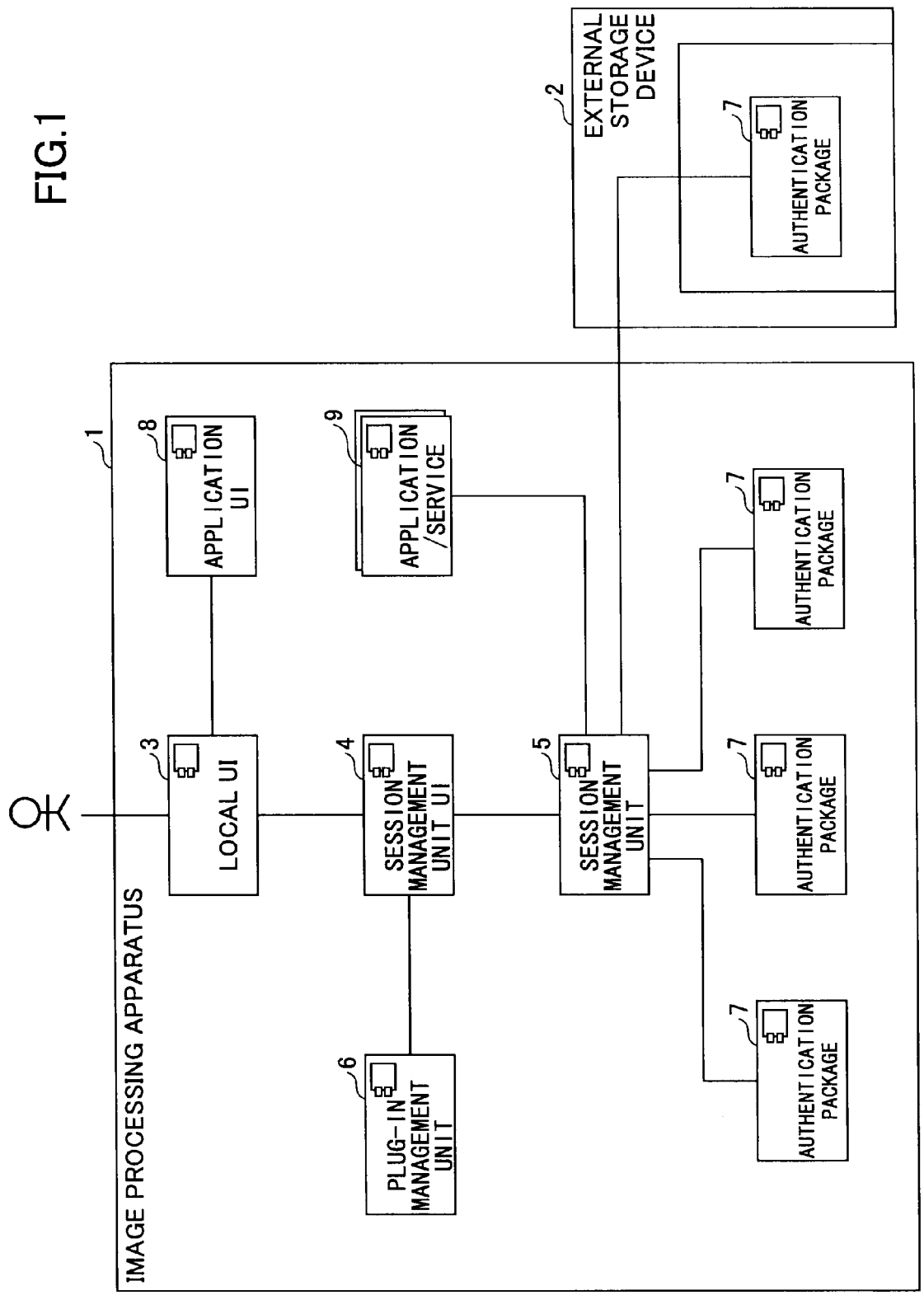
FIG. 1 is a software configuration diagram.

FIG. 1 is a software configuration diagram of the image processing apparatus according the embodiment of the present invention. An image processing apparatus 1 shown in FIG. 1 is configured to have a local UI (User Interface) 3, a session management unit UI 4, a session management unit 5, a plug-in management unit 6, authentication packages 7, an application UI 8, and an application/service 9. Furthermore, the image processing apparatus 1 can perform authentication by using the authentication package 7 stored in an external storage device 2.

The local UI 3 is an interface between the user (operator) and the image processing apparatus 1. The user, for example, inputs data and provides instructions through a display unit, an operations unit, etc., of the image processing apparatus 1. The session management unit 5 manages the entire operations of a system. For example, the session management unit 5 manages a period between login and logout by the user as a session. In addition, along with the management of the session, the session management unit 5 manages the right of the user in this session. Moreover, the session management unit 5 performs the management of the authentication package and confirms the adequacy of the authentication package as described below. Furthermore, the session management unit UI 4 is an interface with the session management unit 5. The plug-in management unit 6 performs management related to the plug-in of the authentication package. In addition, the plug-in management unit 6 confirms the validity of the authentication package as described below.

The application/service 9 is a software program designed for specific purposes. In the case of the image processing apparatus 1, the application/service 9 is an application software program related, for example, to a scanner, a printer, or a facsimile machine. Furthermore, the application UI 8 has a function related to an interface with the application/service 9.

The authentication package 7 is a program related to authentication. Specifically, the authentication package 7 is a program that provides a single authentication method or plural authentication methods. For example, when the user performs the authentication such as login, he/she uses an authentication function provided by the authentication package. The authentication package 7 provides authentication methods such as a local authentication method, a Windows (Registered Trademark) authentication method, a LDAP authentication method, an ID card authentication method, and a fingerprint authentication method.

Figure 2:
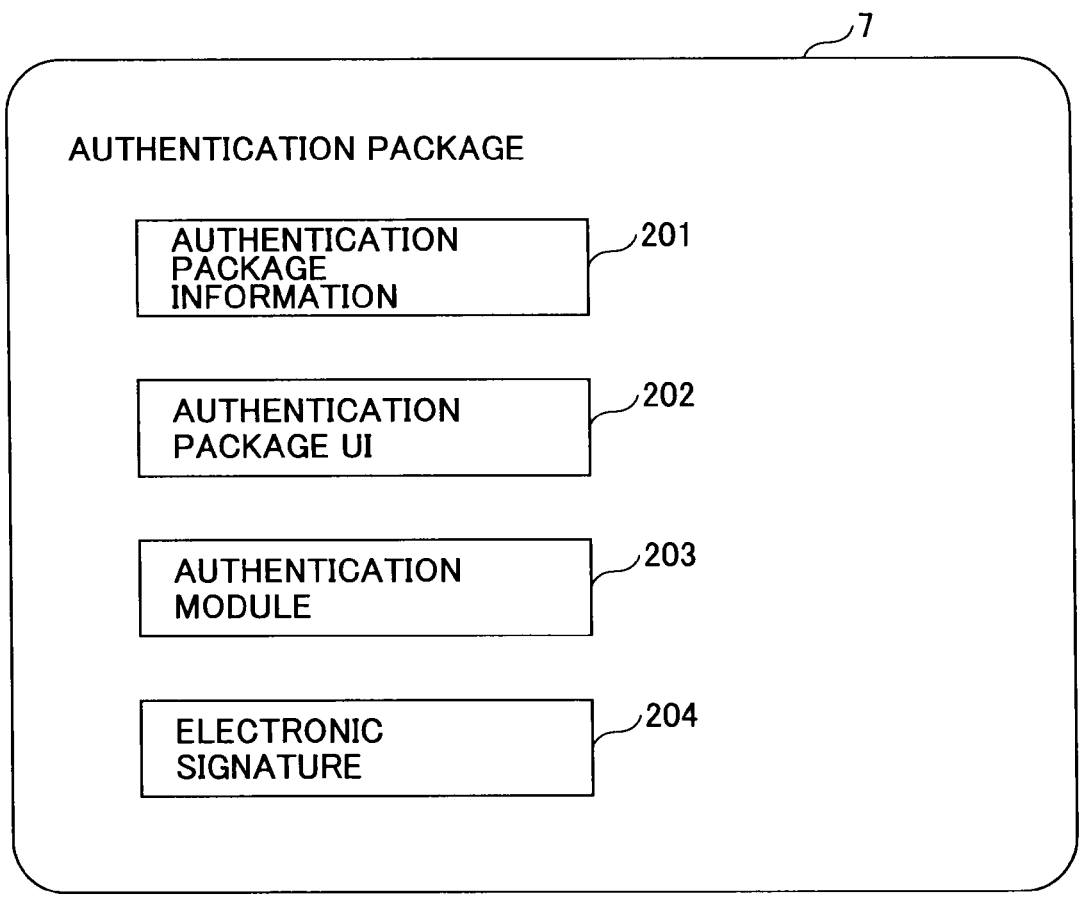
FIG. 2 is a diagram showing an authentication package.
Figure 3:
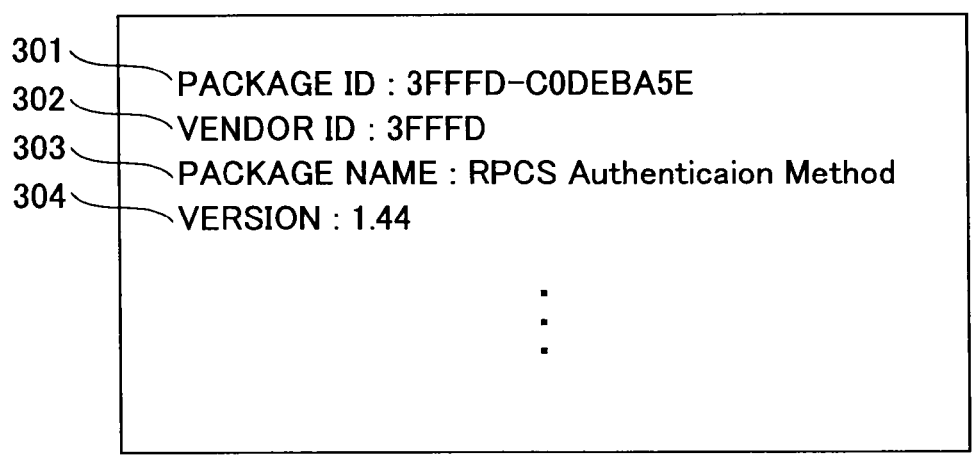
FIG. 3 is a diagram showing authentication package information.

FIG. 2 is a diagram showing the authentication package 7. The authentication package 7 is composed of authentication package information 201, an authentication package UI 202, an authentication module 203, and an electronic signature 204. The authentication package UI 202 is a program that manages a setting screen, an authentication screen, etc. The authentication module 203, which serves as the substantial part of the authentication package, is a program that performs the authentication based on the authentication method related to the authentication package. The electronic signature 204 is related to the issuance source and the manufacturer of the authentication package. The electronic signature 204 is generated according to the secret key of the issuance source. The authentication package information 201 is attribute information related to the authentication package. FIG. 3 is a diagram showing the authentication package information 201. The authentication package information 201 is composed of the attribute information such as a package ID 301, a vendor ID 302, a package name 303, and a version 304. The package ID 301 represents the ID of the authentication package, the vendor ID represents the ID of a vendor that generates the authentication package, the package name 303 represents the name of the authentication package, and the version 304 represents the version information of the authentication package. Particularly, the authentication package information 201 is used for performing the authentication of the authentication package as described below.

(Confirmation of Validity and Adequateness of Authentication Package)

An administrator incorporates the authentication package that provides a required authentication method into the image processing apparatus 1. The confirmation of the validity and the adequacy is performed so as to authenticate whether the authentication package should be plugged in. When the validity and the adequacy of the authentication package are confirmed, the image processing apparatus 1 allows the authentication package to be plugged in. In the image processing apparatus 1, the validity of the authentication package is first confirmed, and the adequacy of the authentication package whose validity has been confirmed is then confirmed.

In the confirmation of the validity, a signature is verified. The electronic signature 204 is attached to the authentication package. The electronic signature is obtained by encrypting with the secret key of an issuance source a message digest generated from a source seed based on a hash function such as MD5 and SHA1. The image processing apparatus 1 has plural public keys and confirms whether the issuance source is an authorized one by using the public keys. In confirming the electronic signature, the message digest generated from the seed based on the hash function such as MD5 and SHA1 agrees with a message digest obtained by decrypting the electronic signature with the public keys. If the issuance source is found to be the one registered in advance, it is determined that the validity of the authentication package is confirmed. Accordingly, the process proceeds next to the confirmation of the adequacy.

In the confirmation of the adequacy, the adequacy of the authentication package is confirmed based on the authentication package information 201. The image processing apparatus 1 allows the authentication package whose adequacy has been confirmed to be plugged in. The confirmation of the adequacy is dedicated to the authentication of the authentication package.

The authentication package information 201 is composed of the attribute information such as the package ID 301, the vendor ID 302, the package name 303, and the version 304. In the confirmation of the adequacy, it is determined whether the issuance source confirmed by the confirmation of the validity agrees with an issuance source corresponding to the vendor ID 302. Note that information in which the vendor ID and the issuance source (for example, vendor name) are associated with each other is stored in advance. The adequacy of the authentication package is confirmed based on the list of the information. FIG. 4 shows an example of the list in which issuance sources (signers), signature keys (public keys), and vendor IDs are associated with each other. Furthermore, it is determined whether the format of the package ID 301 agrees with a predetermined format. For example, it is determined whether the format of the package ID 301 has the string of "5 characters and 8 characters." Accordingly, the authentication package provided by a vendor different from the signer of the vendor ID 302 can be excluded. With the confirmation of the vendor, it is also possible to confirm whether a space assigned for each vendor is properly used. This space is an assigned space that allows a specific area related to software to be used for each vendor. Thus, the emergence of an invalid area is prevented, which in turn can reduce influences such as malfunctions of and trouble with other programs. Furthermore, when a certain specific vendor such as "RICOH" is confirmed, various regulations may be relaxed.

(Addition of Authentication Package)

Figure 5:
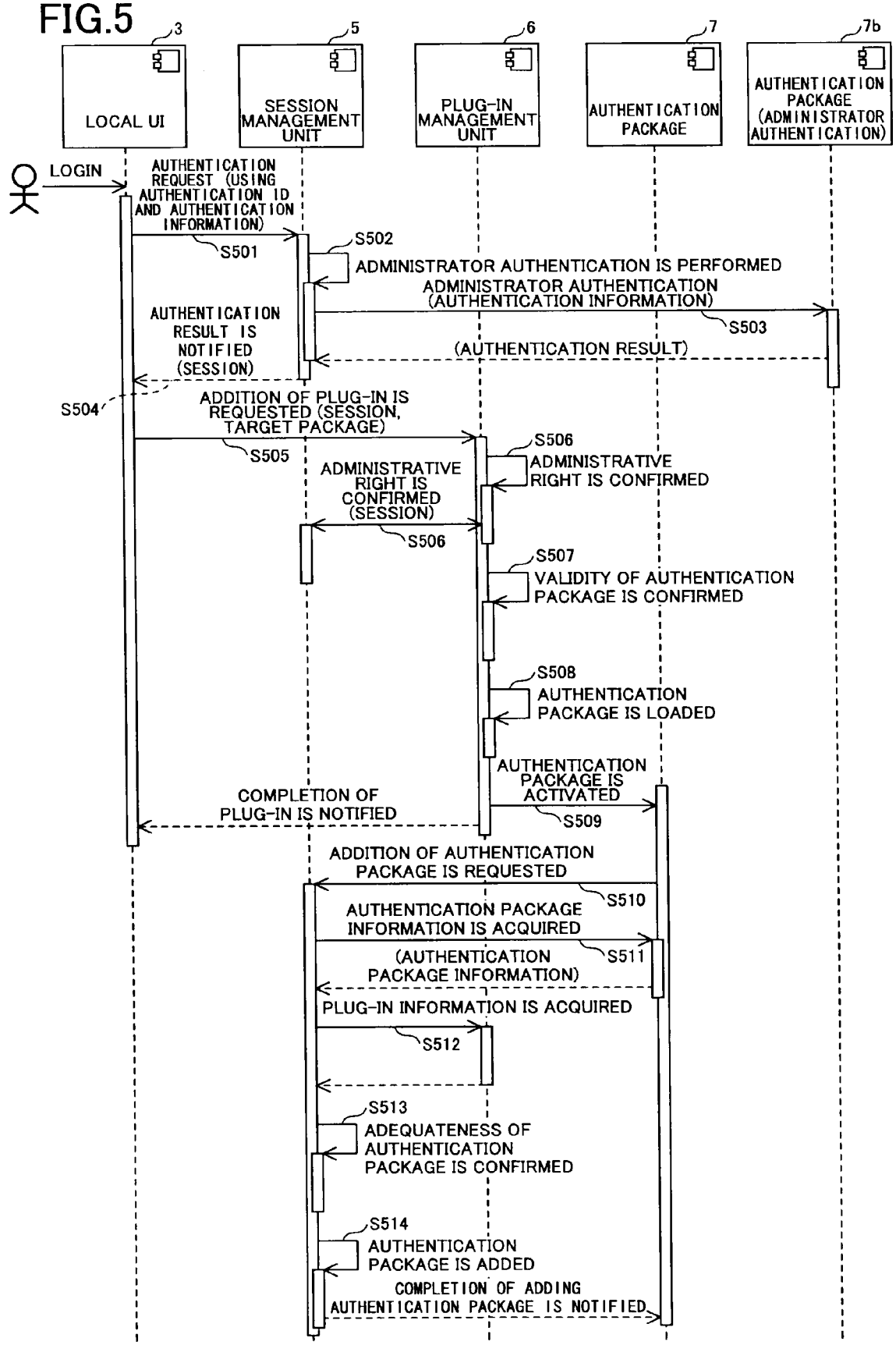

Next, a description is made of the addition of the authentication package 7 to the image processing apparatus 1. FIG. 5 is a sequence diagram when the authentication package 7 is added to the image processing apparatus 1.

The administrator adds a new authentication package to the image processing apparatus 1. The administrator logs in to the local UI 3 through the operations unit, etc. The process proceeds to step S501 where the administrator requests for authentication. The administrator makes this authentication request using an authentication ID and authentication information (such as password) to which an administrative right is provided.

The process proceeds to step S502 where administrator authentication is performed by the session management unit 5. However, in step S503, an authentication package (administrator authentication) 7b is used for performing the administrator authentication.

The process proceeds to step S504 where an authentication result (assumed to be successful) is reported. Subsequently, when the administrator makes a request of adding the new authentication package in step S505, the request for addition of a plug-in is sent to the plug-in management unit 6 through the local UI 3.

The process proceeds to step S506 where the plug-in management unit 6 confirms whether the session management unit 5 has the administrative right. Prior to the plug-in of the authentication package, the presence or absence of the administrative right is confirmed. Note that the session management unit 6 manages the right and confirms the administrative right using the authentication package (administrator authentication) 7b in the foregoing step.

After the confirmation of the administrator authentication, the process proceeds to step S507 where the plug-in management unit 6 confirms the validity of the authentication package 7 as described above.

After the confirmation of the validity, the process proceeds to step S508 where the authentication package is prepared and loaded in a memory. Then, in step S509, the authentication package is activated.

The process proceeds to step S510 where the authentication package 7 sends the request for the addition of the authentication package to the session management unit 5. Then, in step S511, the authentication package 7 acquires the authentication package information 201 from the session management unit 5.

The process proceeds to step S512 where plug-in information is acquired. Here, the plug-in information includes, for example, the information list described above in which the vendor ID and the issuance source (such as vendor name) are associated with each other. In addition, the plug-in information includes the format of the package ID 301.

The process proceeds to step S513 where the confirmation of the adequacy as described above is performed based on the issuance source whose validity has been confirmed, the acquired authentication package information 201, and the plug-in information.

After the confirmation of the adequacy, the process proceeds to step S514 where the authentication package is added.

As described above, the image processing apparatus according to the embodiment of the present invention has management procedures including the verification of the authentication package and the authentication from a specific administrator.

(Administrator Screen)

Figure 6:
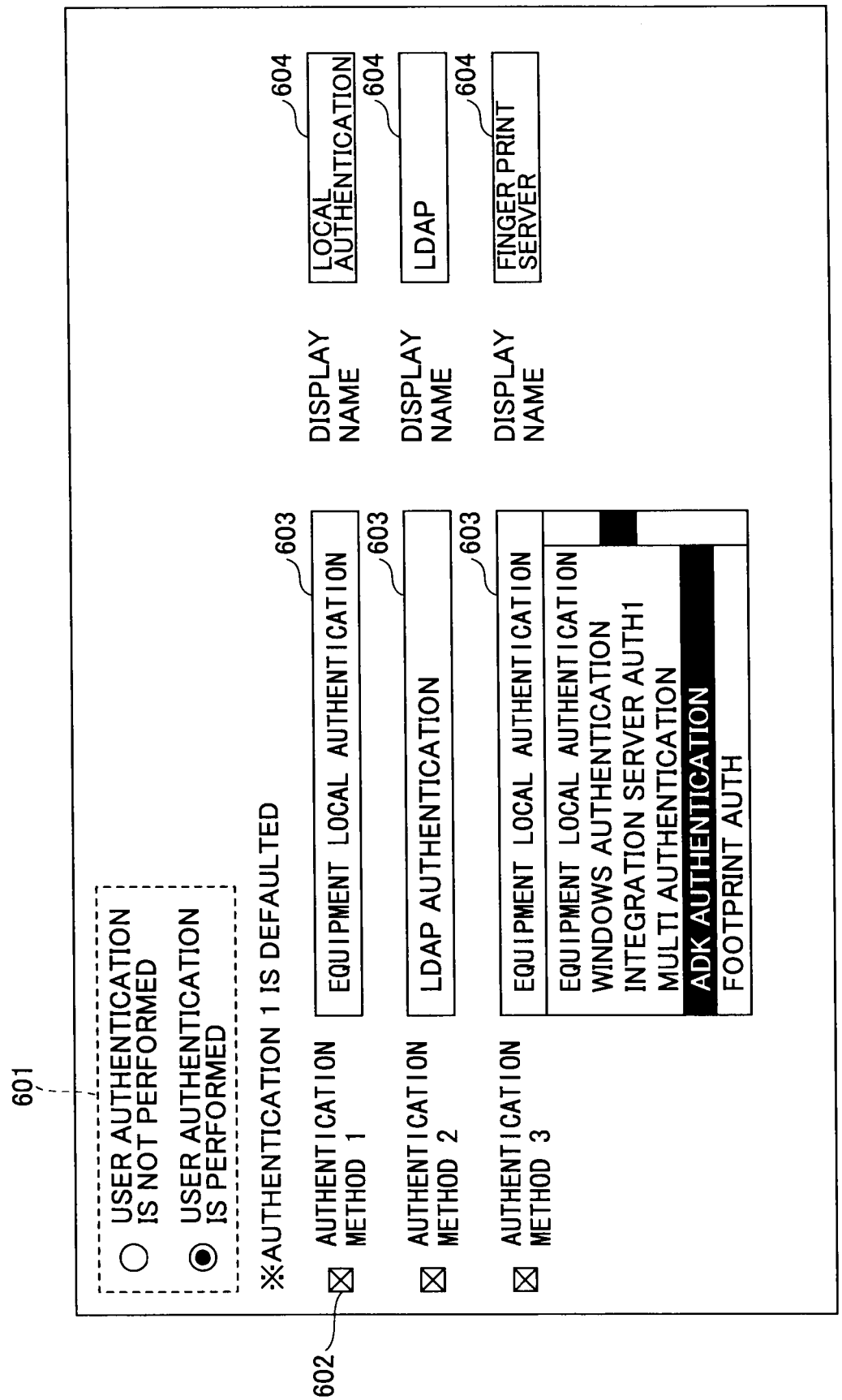
FIG. 6 is a diagram showing an example of an administrator screen.

FIG. 6 is a diagram showing an example of a screen on which the administrator sets authentication methods capable of being used by the user. The user performs the authentication by using one of the authentication methods set by the administrator.

Reference numeral 601 denotes a check box for user authentication. Here, when the user selects the alternative of "user authentication is not performed," he/she can use the image processing apparatus 1 without performing the authentication. On the other hand, when the user selects the alternative of "user authentication is performed," he/she is required to perform the authentication before using the image processing apparatus 1. Reference numerals 602 denote check boxes with which an authentication method is made valid or invalid. Using the check boxes, the user can add and delete an authentication method. Reference numerals 603 denote items where the user selects a specific authentication method with respect to the authentication method that the user selects. When a new authentication package is added, the name of this authentication package is added to the list of the items. As a result, the authentication package is capable of being selected by the user. In this example, the authentication methods 1 through 3 are capable of being set. Reference numerals 604 denote display names displayed to the user. The complicated name of the authentication method is replaced by a shortened name, which is easy for the user to understand.

As described above, the software that provides an authentication function is plugged in as the authentication package, and the dynamic change of the configuration is performed in a flexible manner. Therefore, the administrator can dynamically add and delete the authentication method.

(Activation)

Figure 7:
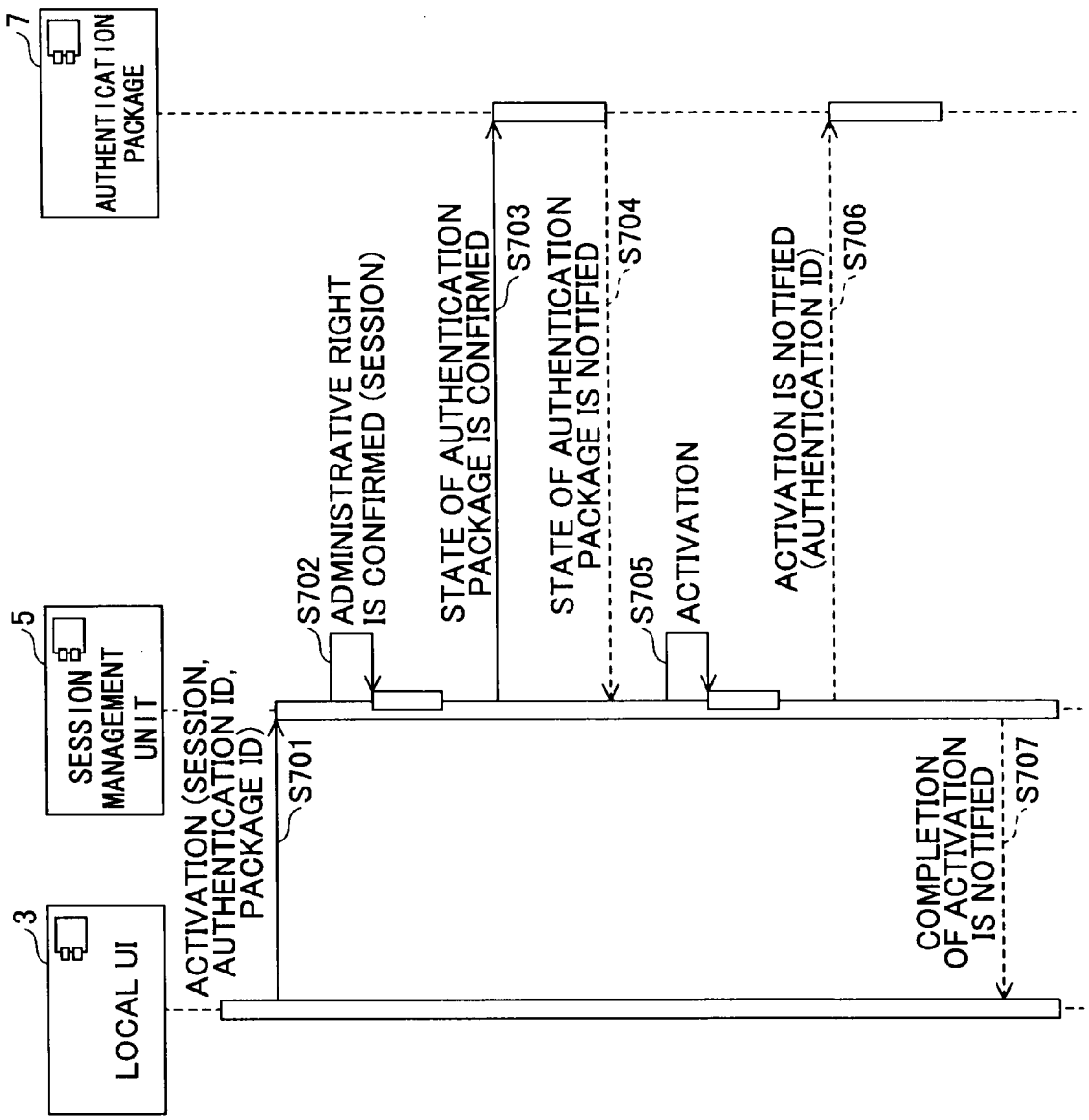
FIG. 7 is a sequence diagram related to the activation of the authentication package.

Next, a description is made of the activation of the plugged-in authentication package. When the administrator sets an authentication method in accordance with the administrator screen of FIG. 6, the authentication package corresponding to the authentication method is activated (made valid). FIG. 7 is a sequence diagram related to the activation of the authentication package.

In step S701, the local UI 3 requests for the activation to the session management unit 5. This request is made when the administrator selects a predetermined authentication method from the administrator screen and presses, for example, a setting button. Using the request as a trigger, the local UI 3 provides information related to a session, an authentication ID, and a package ID to the session management unit 5. Note that the authentication ID indicates what number the authentication method is in accordance with the reference numerals 603 of FIG. 6. Furthermore, the package ID indicates the authentication package in accordance with the reference numeral 301 of FIG. 3.

The process proceeds to step S702 where the session management unit 5 confirms an administrative right because the administrative right is required for activating the authentication package.

After the confirmation of the administrative right, the process proceeds to steps S703 and S704 where the session management unit 5 confirms the state of the authentication package 7.

The process proceeds to step S705 where the session management unit 5 activates the authentication package. The completion of the activation is reported in steps S706 and S707.

In accordance with the procedure described above, the session management unit 5 manages the authentication package activated in accordance with the procedure described above. In addition, the session management unit 5 provides the authentication method corresponding to the authentication package, which is activated and made available, to the user in a selective manner in accordance with user operations described below.

(User Authentication)

Figure 8:
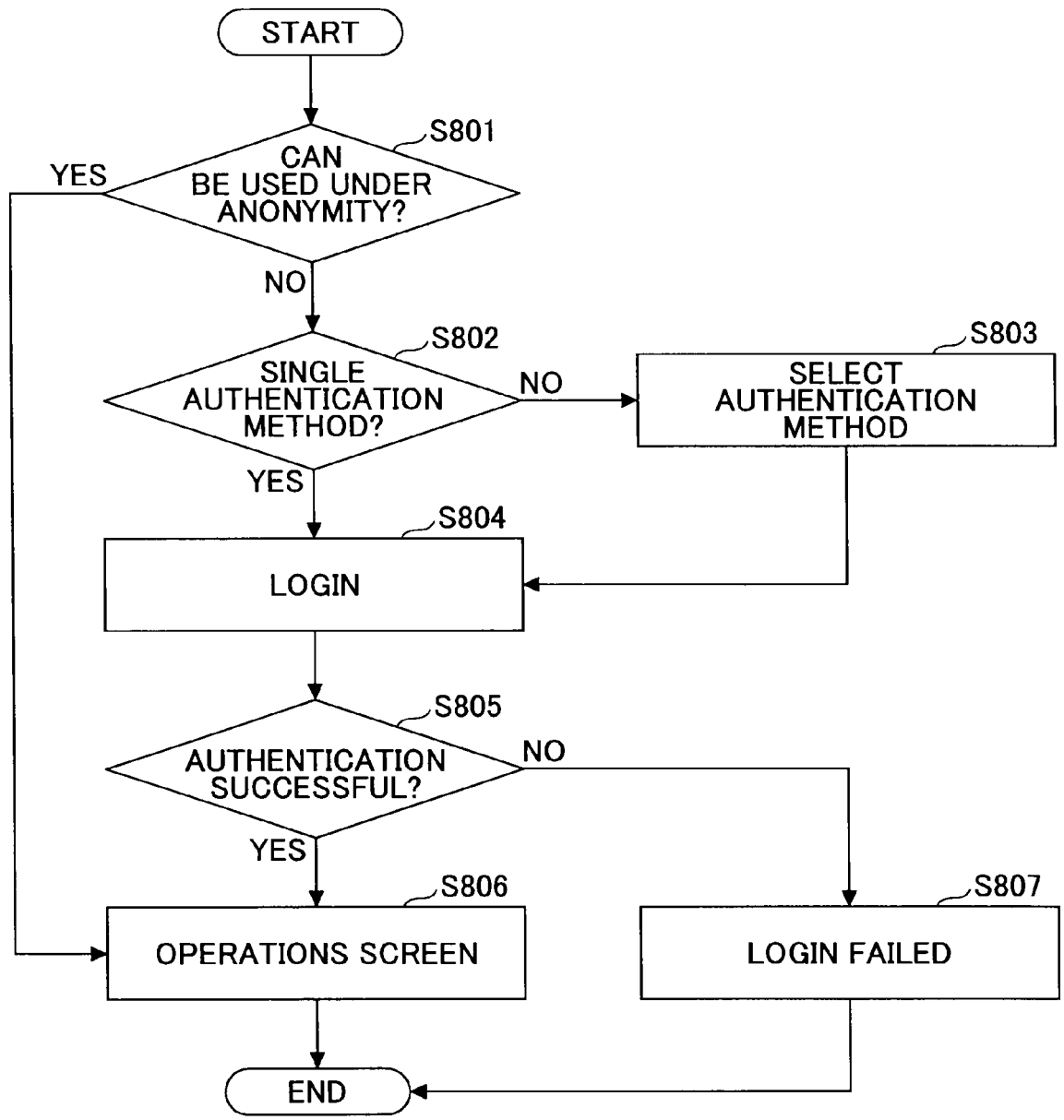
FIG. 8 is a flowchart related to login by the user.

FIG. 8 is a flowchart related to login when the user uses the image processing apparatus 1. Referring next to the flowchart, a description is made of a login operation by the user.

In step S801, it is determined whether the image processing apparatus 1 can be used under anonymity. If the image processing apparatus 1 can be used under anonymity, the process proceeds to step S806 where the operations screen is displayed and the user is capable of using the image processing apparatus 1 without performing the authentication.

Figure 9:
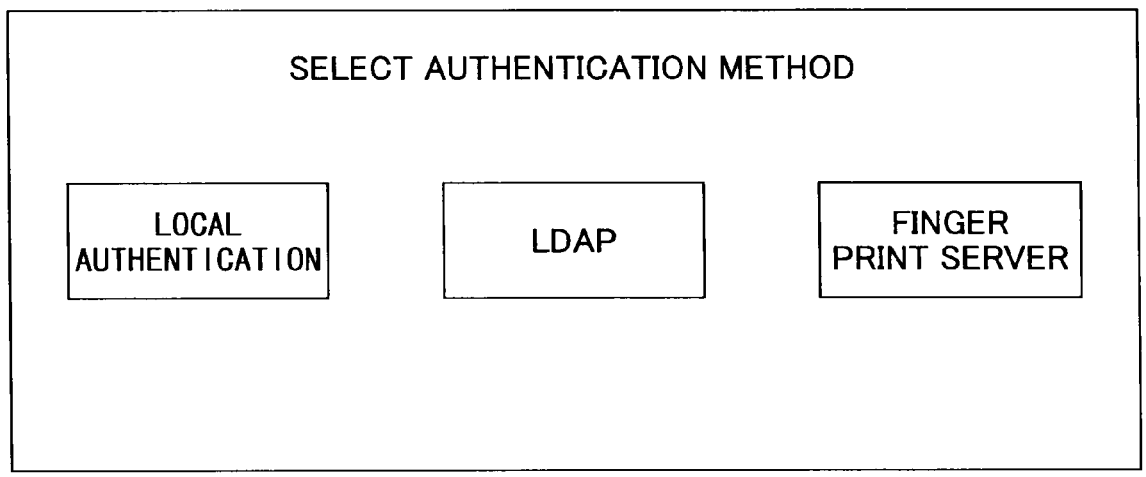
FIG. 9 is a diagram showing an example of a screen on which the user selects an authentication method.

On the other hand, if the image processing apparatus 1 cannot be used under anonymity, the process proceeds to step S802 where it is determined whether the authentication method is a single authentication method. Here, the single authentication method represents that the number of authentication methods the user can use is singular rather than plural. If the authentication method is not the single authentication method, the process proceeds to step S803 where the user selects one of the authentication methods. FIG. 9 is an example of a screen for prompting the user to select the authentication method. The screen corresponds to the contents set on the administrator screen of FIG. 6. In this case, the three authentication methods of "local authentication", "LDAP," and "fingerprint server" are set by the administrator. The user can select one of the set authentication methods and perform the login. In this case, the user selects any of the authentication methods.

Figure 10:
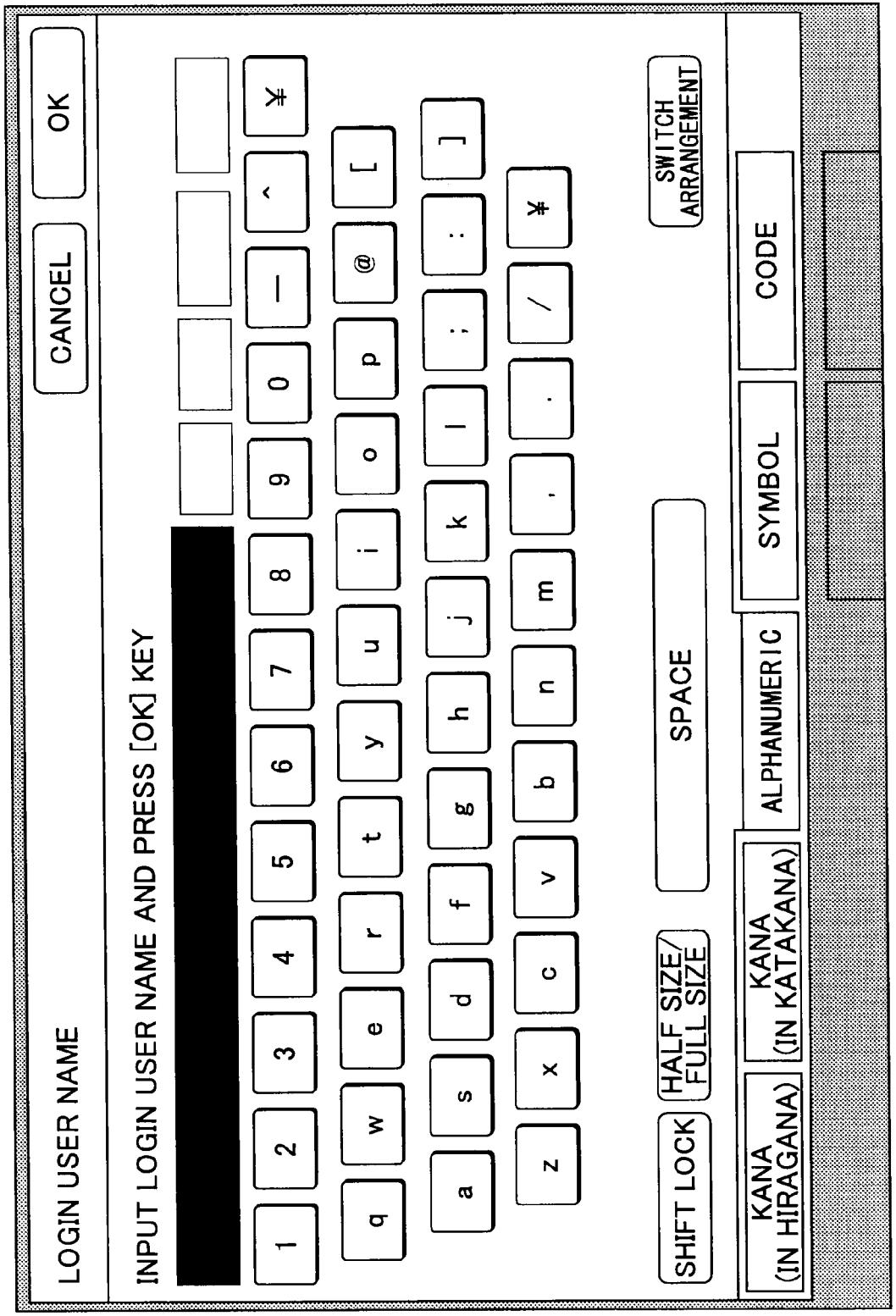
FIG. 10 is a diagram showing an example of a login screen.

When the authentication method is determined in steps S802 and S803, the process proceeds to step S804 where the user performs the login. FIG. 10 shows an example of a login screen.

Figure 11:
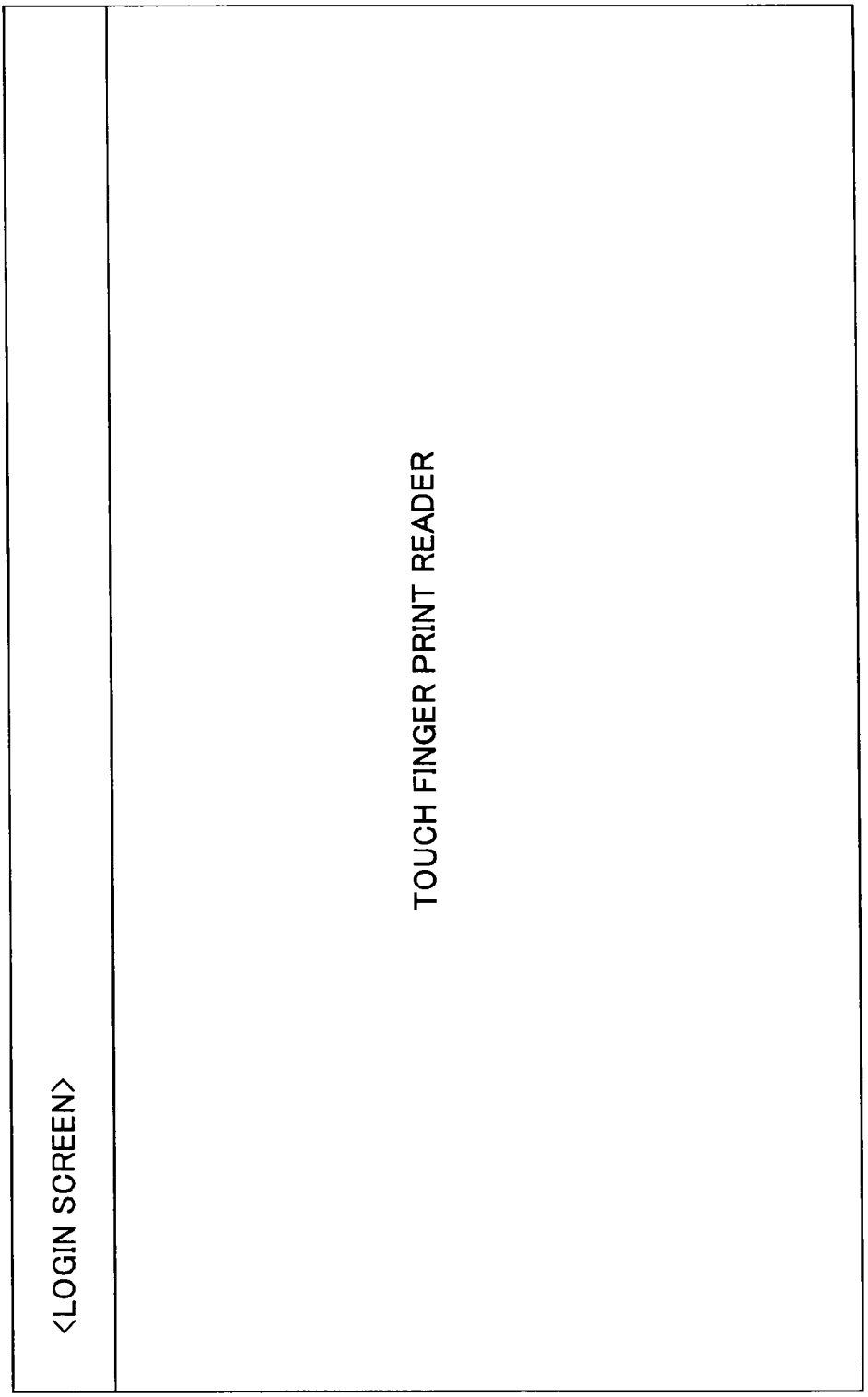
FIG. 11 is a diagram showing an example of the login screen.

Note that the login screen changes in accordance with the authentication methods. For example, when the user selects the "fingerprint server" as one of the authentication methods and performs the login, the authentication is made by a fingerprint authentication method. Therefore, the login screen requires a mechanism for reading a fingerprint. In this case, for example, a fingerprint reading unit is provided on the login screen and configured to cooperate with the login screen. FIG. 11 shows an example of the login screen when the user selects the fingerprint authentication method. Furthermore, in the case of an IC card authentication method, an IC card reading unit is provided on the login screen and performs login authentication based on information read from an IC card. As described above, the login screen in accordance with the authentication method is used.

Figure 12:
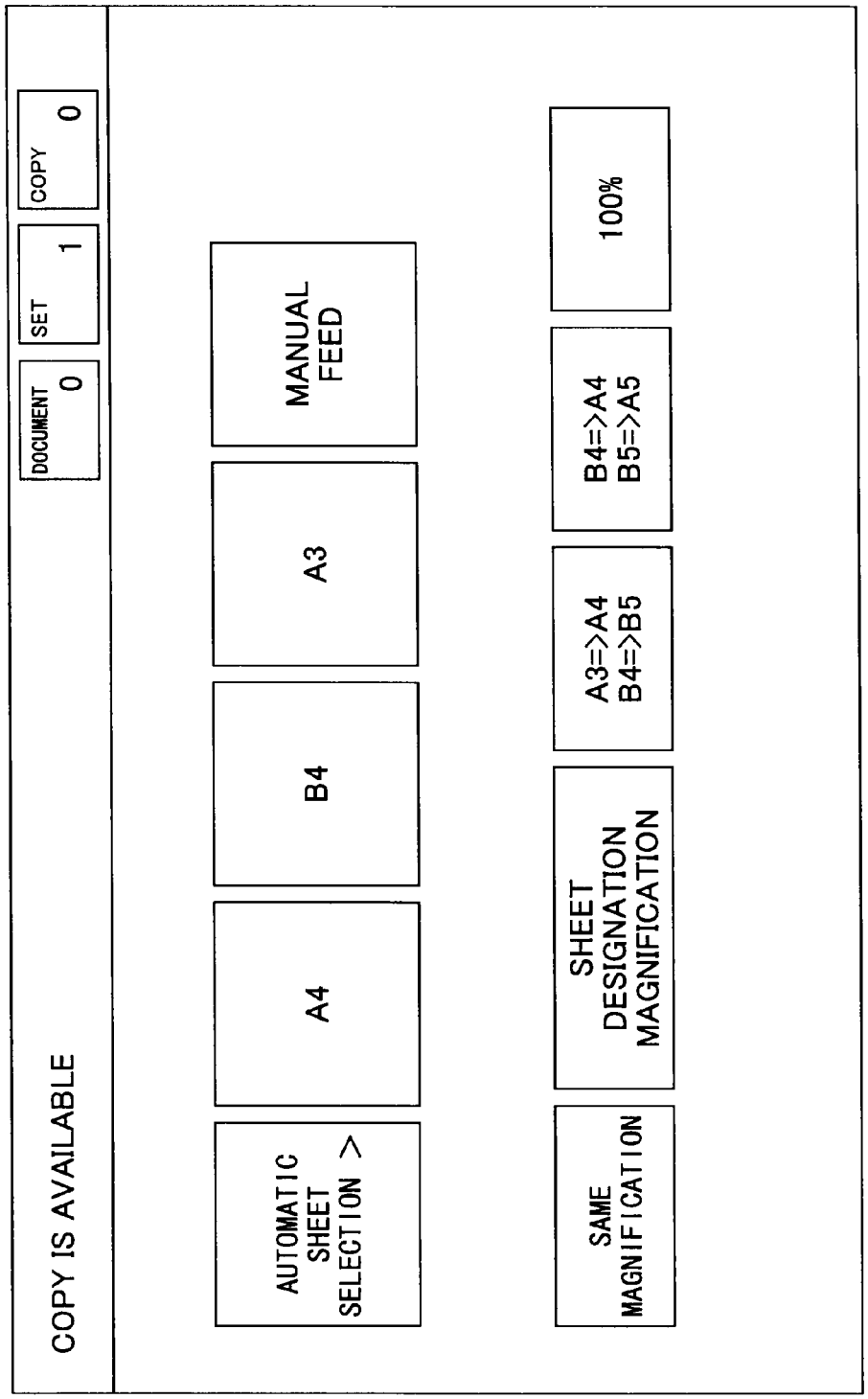
FIG. 12 is a diagram showing an example of an operations screen.

If the login authentication is successful in step S805, the user can use the operations screen of the image processing apparatus 1 in step S806. FIG. 12 shows an example of the operations screen. On the other hand, if the login authentication fails in step S805, a message such as "login failed" is displayed to the user in step S807. The user performs the login in accordance with the flow described above.

Note that the authentication may be performed where the image processing apparatus 1 is used under anonymity. In this case, when the image processing apparatus 1 is used under anonymity, the user is allowed to use a part of functions. When the authentication is performed, an available function is added in accordance with the right of the user.

The flow of the login is described above referring to FIG. 8. Next, a description is made of the sequence of the login by the user.

When the user performs the login through the operations unit, the local UI 3 requests the acquisition of a list of available authentication methods from the session management unit 5. This request is made when the image processing apparatus 1 has plural authentication methods (authentication packages). The session management unit 5 returns the authentication methods set by the administrator to the local UI 3. Here, an authentication ID, an authentication package ID corresponding to the authentication ID, and an authentication package name are returned.

Figure 13:
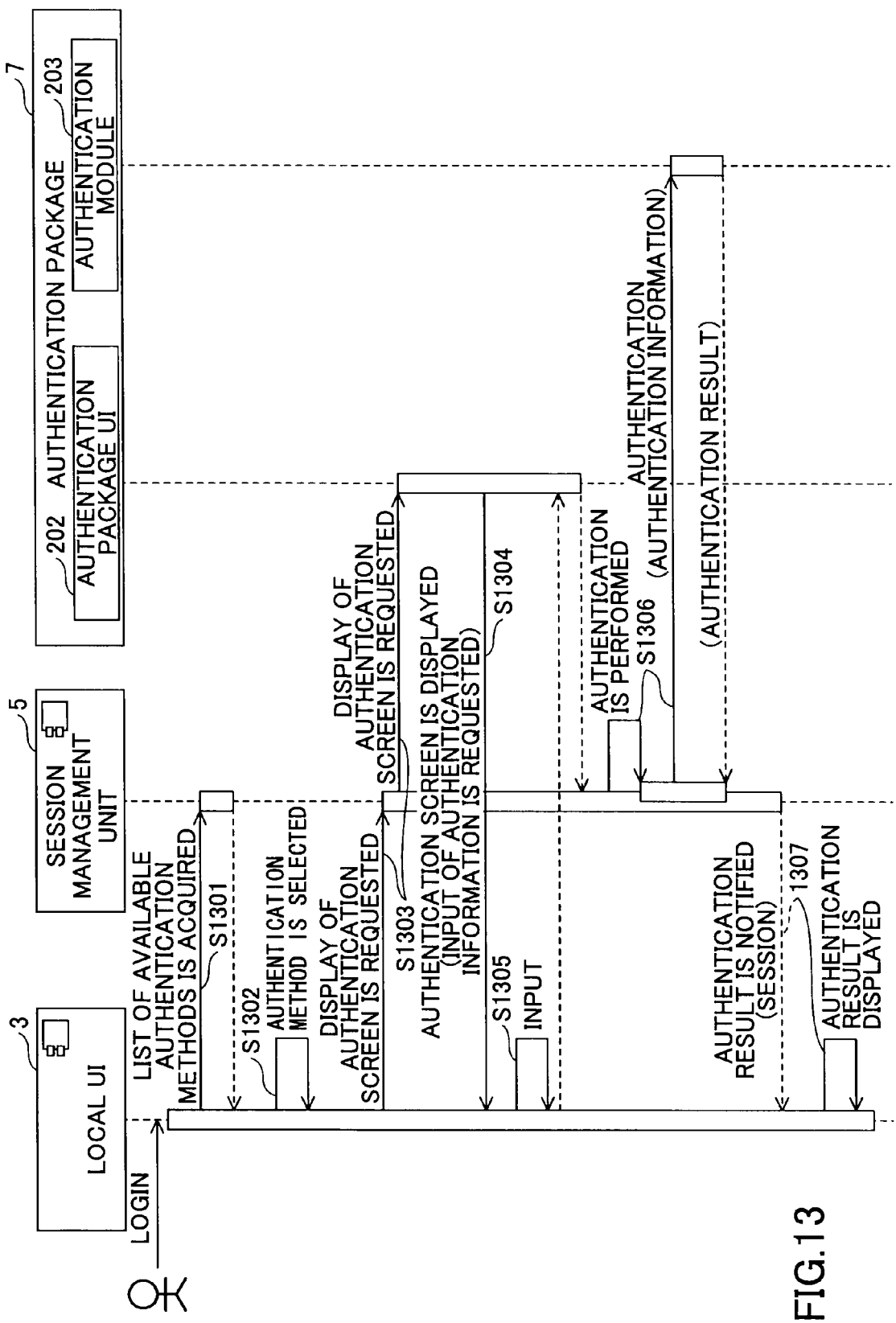
FIG. 13 is a sequence diagram related to the login by the user.

When the authentication methods are returned, the screen shown in FIG. 9 is displayed. The process proceeds to step S1302 in FIG. 13 where the user selects one of the authentication methods.

The process proceeds to step S1303 where the local UI 3 requests for the display of an authentication screen corresponding to the selected authentication method. The authentication package UI 202 receives the request through the session management unit 5 and returns the authentication screen to the local UI 3 in step S1304. This corresponds to an authentication information input request. Note that the authentication screen is provided by the authentication package UI 202 for each authentication package. Because the authentication screen is maintained in units of authentication package, it is possible to display an inherent authentication screen corresponding to the selected authentication method to the user. Accordingly, the authentication screen can be dynamically displayed in accordance with the selected authentication method. The authentication screen provided by the authentication package UI 202 corresponds to the screens shown in FIGS. 10 and 11.

When the authentication information corresponding to the selected authentication method is input in step S1305, the authentication information is given to the session management unit 5 through the authentication package UI 202.

The process proceeds to step S1306 where the session management unit 5 performs the authentication based on the authentication method. Actually, the session management unit 5 causes the authentication module 203 to perform the authentication.

In step S1307, the result of the authentication performed by the authentication module 203 is returned to the local UI 3.

In step S1307, a message such as "authentication successful" or "authentication failed" is displayed to the user through the local UI 3.

As described above, the user can use the plural authentication methods at the time of the login. For example, when the local authentication method and the IC card authentication method are set, the user can generally perform the login only by holding a convenient IC card to an IC card reader. Here, when the user forgets the IC card, he/she cannot perform the login because a system providing only the IC card authentication method is limitative in its authentication method. Therefore, the user can no longer perform the login and has only the way of contacting the administrator. However, when the user selects the local authentication method instead of the IC card authentication method and performs the login according to the embodiment of the present invention, he/she can perform the login without any problem.

The present invention is not limited to the specifically disclosed embodiments, and variations and modifications may be made without departing from the scope of the present invention.

The present application is based on Japanese Priority Application No. 2008-038829 filed on Feb. 20, 2008, the entire contents of which are hereby incorporated herein by reference.

What is claimed is:

1. An image processing apparatus comprising:
an installation unit that installs an authentication package providing a function related to authentication, the authentication package being provided with attribute information of the authentication package and being attached with an electronic signature that is related to an issuance source of the authentication package;
a signature confirmation unit that confirms whether the issuance source of the authentication package is an authenticated issuance source based on the electronic signature attached to the authentication package and first information stored in the image processing apparatus for confirming the validity of the electronic signature; and
an authentication package confirmation unit that confirms adequacy of installing the authentication package which is confirmed to be issued by an authenticated issuance source by the signature confirmation unit, based on the attribute information of the authentication package provided with the authentication package and second information stored in the image processing apparatus for confirming the adequacy of installing the authentication package;
wherein the attribute information of the authentication package includes a vendor ID that corresponds to the issuance source of the authentication package, the second information stored in the image processing apparatus for confirming the adequacy of installing the authentication package is a vendor ID associated with the first information for confirming the validity of the electronic signature, and
the authentication package confirmation unit confirms the adequacy of installing the authentication package when the vendor ID of the authentication package agrees with the vendor ID stored in the image processing apparatus;
wherein the installation unit installs the authentication package confirmed by the authentication package confirmation unit.

2. The image processing apparatus according to claim 1, wherein
the attribute information of the authentication package includes an authentication package ID of the authentication package,
the second information stored in the image processing apparatus for confirming the adequacy of installing the authentication package is a format of the authentication package ID, and
the authentication package confirmation unit confirms the adequacy of installing the authentication package when a format of the authentication package ID of the attribute information agrees with the format of the authentication package ID stored in the image processing apparatus.

3. An authentication package installation method for installing an authentication package providing a function related to authentication into an image processing apparatus, the authentication package being provided with attribute information of the authentication package and being attached with an electronic signature that is related to an issuance source of the authentication package, the method comprising:
performing a signature confirmation step of confirming whether the issuance source of the authentication package is an authenticated issuance source based on the electronic signature attached to the authentication package and first information stored in the image processing apparatus for confirming the validity of the electronic signature;
after confirming that the issuance source of the authentication package is the authenticated issuance source in the signature confirmation step, performing an authentication package confirmation step of confirming the adequacy of installing the authentication package based on the attribute information of the authentication package provided with the authentication package and second information stored in the image processing apparatus for confirming the adequacy of installing the authentication package;
wherein the attribute information of the authentication package includes a vendor ID that corresponds to the issuance source of the authentication package,
the second information stored in the image processing apparatus for confirming the adequacy of installing the authentication package is a vendor ID associated with the first information for confirming the validity of the electronic signature, and
in the authentication package confirmation step, the adequacy of installing the authentication package is confirmed when the vendor ID of the authentication package agrees with the vendor ID stored in the image processing apparatus; and
after confirming the adequacy of installing the authentication package in the authentication package confirmation step, performing an installation step of installing the authentication package confirmed in the authentication package confirmation step into the image processing apparatus.

4. The authentication package installation method according to claim 3, wherein,
the attribute information of the authentication package includes an authentication package ID of the authentication package,
the second information stored in the image processing apparatus for confirming the adequacy of installing the authentication package is a format of the authentication package ID, and
in the authentication package confirmation step, the adequacy of installing the authentication package is confirmed when a format of the authentication package ID of the attribute information agrees with the format of the authentication package ID stored in the image processing apparatus.

5. A non-transitory computer-readable recording medium having recorded thereon an authentication package installation program that causes a computer to execute an authentication package installation method for installing an authentication package providing a function related to authentication into an image processing apparatus, the authentication package being provided with attribute information of the authentication package and being attached with an electronic signature that is related to an issuance source of the authentication package, the method comprising:

performing a signature confirmation step of confirming whether the issuance source of the authentication package is an authenticated issuance source based on the electronic signature attached to the authentication package and first information stored in the image processing apparatus for confirming the validity of the electronic signature;

after confirming that the issuance source of the authentication package is the authenticated issuance source in the signature confirmation step, performing an authentication package confirmation step of confirming the adequacy of installing the authentication package based on the attribute information of the authentication package provided with the authentication package and second information stored in the image processing apparatus for confirming the adequacy of installing the authentication package;

wherein the attribute information of the authentication package includes a vendor ID that corresponds to the issuance source of the authentication package, the second information stored in the image processing apparatus for confirming the adequacy of installing the authentication package is a vendor ID associated with the first information for confirming the validity of the electronic signature, and in the authentication package confirmation step, the adequacy of installing the authentication package is confirmed when the vendor ID of the authentication package agrees with the vendor ID stored in the image processing apparatus; and after confirming the adequacy of installing the authentication package in the authentication package confirmation step, performing an installation step of installing the authentication package confirmed in the authentication package confirmation step into the image processing apparatus.

6. The image processing apparatus according to claim 1, wherein the electronic signature attached to the authentication package is obtained by encrypting with a secret key of the issuance source of the authentication package, and the first information for confirming the validity of the electronic signature is a public key.

7. The authentication package installation method according to claim 3, wherein the electronic signature attached to the authentication package is obtained by encrypting with a secret key of the issuance source of the authentication package, and the first information for confirming the validity of the electronic signature is a public key.

8. The image processing apparatus according to claim 1, wherein the second information associates the first information with corresponding attribute information.

9. The authentication package installation method according to claim 3, wherein the second information associates the first information with corresponding attribute information.

* * * * *